United States Patent [19]

Bydlon

[11] Patent Number: 4,760,533

[45] Date of Patent: Jul. 26, 1988

[54] APPARATUS FOR CONTROLLING THE OPERATING MODE OF A HYDROCARBON DISTRIBUTOR OF ELECTRONIC COMPUTER DESIGN

[75] Inventor: Jean Bydlon, Aulnay Sous Bois, France

[73] Assignee: Volucompteurs Aster Boutillon, Montrouge, France

[21] Appl. No.: 649,404

[22] Filed: Sep. 11, 1984

[30] Foreign Application Priority Data

Sep. 13, 1983 [FR] France ................................ 83 14519

[51] Int. Cl.[4] ..................... G05D 15/02; G06F 15/22; B67D 5/08; G01D 1/04

[52] U.S. Cl. .................................... 364/465; 364/160; 455/603

[58] Field of Search ............... 364/464, 465, 510, 160; 455/603, 602, 601, 600, 4; 360/33.1; 358/194.1

[56] References Cited

U.S. PATENT DOCUMENTS

| | | | |
|---|---|---|---|
| 3,935,435 | 1/1976 | Greenwood | 364/465 |
| 4,005,412 | 1/1977 | Leander | 340/815.31 |
| 4,216,529 | 8/1980 | Krystek et al. | 364/510 |
| 4,237,537 | 12/1980 | Pitches et al. | 364/465 |
| 4,410,949 | 10/1983 | Huellinghorst et al. | 364/465 |
| 4,527,204 | 7/1985 | Kozakai et al. | 360/33.1 |

OTHER PUBLICATIONS

B. Dance, "Remote Control Systems for Television and Other Applications-II", Australian Electronics Engineering, vol. 11, No. 5, May, 1978, pp. 29-36.

Melcher et al., Infrared Remote Control-Module System INFRAFERN Components Report XIII (1978), No. 5 (Nov. 1978), pp. 144-149, in 455-603.

*Primary Examiner*—Felix D. Gruber

*Attorney, Agent, or Firm*—Dale Gaudier

[57] ABSTRACT

An electronic computer disposed in an explosion-proof casing of a hydrocarbon distributor has its operating mode controlled by a portable box external to the distributor which includes apparatus for emitting a coded infrared beam representative of the desired operating mode. Inside the casing of the computer there is provided decoding apparatus for generating information in response to the infrared beam emitted by the external box. The casing is provided with a window allowing the passage of the infrared beam.

2 Claims, 3 Drawing Sheets

APPARATUS FOR CONTROLLING THE OPERATING MODE OF A HYDROCARBON DISTRIBUTOR OF ELECTRONIC COMPUTER DESIGN

BACKGROUND OF THE INVENTION

This invention relates to an apparatus for controlling the operating mode of a hydrocarbon distributor of electronic computer design.

More precisely the object of the invention is such a control apparatus utilizable notably in a hydrocarbon distributor in which there is a volumetric transducer allowing the measurement of the distributed hydrocarbon volume and including a mechanical output whose displacement is representative of the measured volume and a converter for associating with the displacement of the output device a number of pulses representative of the distributed volume. The distributor further comprises a set of electronic circuits making it possible to compute, from the pulses representing the measured volume and on the basis of unit price information, the cost corresponding to the distributed volume.

It will be understood that in such a type of distributor there is the coexistence of, on the one hand, elements in which the hydrocarbon flows and, on the other, electric or electronic circuits capable, during their operation, of causing short-circuits or sparks. It is thus necessary to separate the zone in which the electronic circuits are located from the zone in which the hydrocarbon flow lines are located, for obvious safety reasons.

A first solution of this problem consists in designing, from the outset, a distributor in which there is a first zone housing the components in which the hydrocarbon flows and a second zone in which all the electronic circuits are located, these two zones being separated by a hydrocarbon-vapor-proof partition forming an integral part of the distributor frame.

However, there are presently still a very large number of hydrocarbon distributors in which the calculation of the cost and its display are obtained by means of entirely mechanical devices. It is understood that, in this case, there is no risk of explosion. The distributor frame consequently does not include any particular sealing structure. Owing to the advantages offered by electronic computers (reliability, utilization flexibility, etc.), a large number of hydrocarbon distributor owners wish to replace their mechanical calculating device by an electronic computer. However, owing to the initial structure of the distributor frame, it would be very costly to install a hydrocarbon-proof partition to separate the components in which the hydrocarbon flows from the computer part.

The solution generally adopted consists in enclosing within an explosion-proof casing all the electronic circuits. The mechanical output of the volumetric transducer penetrates into the explosion-proof casing via a specially designed bushing. It is, however, necessary to be able to introduce into the computing circuits a certain amount of data to control the operating mode of the hydrocarbon distributor. These data consist mainly of the unit price of the hydrocarbon used for calculating the cost of the hydrocarbon delivered on the basis of the pumped volume. These data must be easily modified. Other data related to the operating mode should also be introducible. For example, it should be possible to control the distributor in the independent operating or self-service mode (remote-metering). It should also be possible to deliver to the computer many other types of data related to the operating mode, notably to control the display of the total volume distributed during a given period or the total amount of the sums invoiced to users during this same period.

The main problem lies in the fact that the information should be transmitted to the computing circuit through the explosion-proof casing without altering the properties of the latter. A first solution proposed consists in using push buttons which go through the explosion-proof casing, while complying with the established rules maintaining its explosion-proof characteristics. This makes it necessary, at each push button, to provide special explosion-proof arrangements and the structure of the casing is much more complex and its construction consequently much costlier. Another solution proposed consists in using a single mechanical device which goes through the explosion-proof casing. Relatively complex combinations of the movements of this mechanical device must be implemented to allow the introduction of all the required information. It is easily understood that such a single device involves a complex mechanical design and that, moreover, operating errors are liable to occur frequently. Furthermore, the total number of different types of data it is possible to introduce by means of such a system is necessarily limited.

SUMMARY OF THE INVENTION

To overcome these drawbacks, it is an object of the invention to provide an apparatus for controlling the operating mode of the distributor, making it possible to simplify the design of the flame-proof casing while allowing the introduction into the computer of a large amount of data or information values without complex manipulations.

To achieve this, the invention provides an apparatus for controlling the operating mode of a hydrocarbon distributor of the type comprising means for measuring the hydrocarbon volume distributed, an explosion-proof enclosure, an electronic computing circuit placed inside said enclosure to deliver at least the cost of the distributed hydrocarbon on the basis of the distributed volume information and operating mode data, and means for displaying at least said cost delivered by said computing circuit, said apparatus further comprising:

external control means outside of said distributor to generate a coded wave beam representative of one of the operating mode data;

a window provided in said enclosure and made of a material allowing the passage of said coded beam while keeping said enclosure explosion-proof; and, inside said enclosure, means placed opposite said window to convert said beam emitted by said external means into coded electric signals and means for decoding said electric signals and generating information representative of one of said operating modes.

It is thus seen that the control apparatus does not incorporate any mobile component going through the explosion-proof enclosure.

Preferably, said beam is a coded infrared beam.

DESCRIPTION OF THE DRAWINGS

Other characteristics and advantages of the invention will appear more clearly upon reading the description which follows of a preferred embodiment of the invention in conjunction with the appended drawings in which.

DESCRIPTION OF PREFERRED EMBODIMENTS

Figure 2:
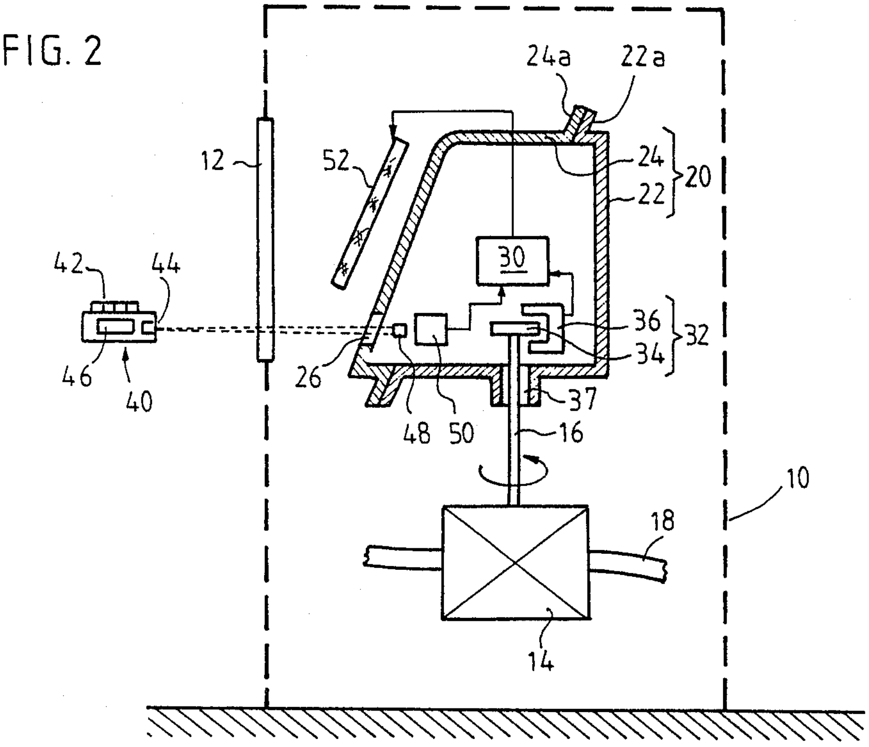
FIG. 2 is a simplified diagram representing a vertical section of the main devices of the distributor to show the control apparatus according to the invention and its installation in relation to the distributor.
Figure 1:
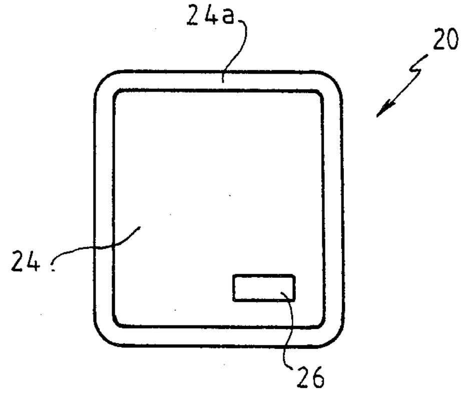
FIG. 1 is a front view and an elevation of the explosion-proof casing used in the invention.

Referring first to FIGS. 1 and 2, a description will be given of the general structure of the operating mode control apparatus and its arrangement in relation to the distributor in general. In FIG. 2, a broken line is used to represent the distributor frame bearing the reference number 10. Also represented is a glass 12 of the hydrocarbon distributor. Inside the frame is represented at 14 the hydrocarbon volumemtric transducer with its mechanical output device 16. It is of a conventional type. The transducer 14 is mounted on the hydrocarbon distribution line 18. Inside the frame 10 is also provided a flame-proof casing 20. The latter will be made up preferably of two half-casings 22 and 24 connected together by means of flanges *22a* and *24a* respectively which are screwed together. Each flange has a seal of sufficient length to ensure that the explosion-proof properties are maintained. As can be better seen in FIG. 1, the front half-casing 24 of the flame-proof casing 20 includes a window 26 made of a material allowing the passage of the infrared rays. In FIG. 2 this window is placed opposite the glass 12. However, the window 12 is preferably protected by a cover insensitive to infrared rays and accessible only after opening a door of the distributor. The window has characteristics which moreover ensure sufficient mechanical strength with respect to any explosion. The window is made, for example, of ordinary glass having a thickness of 5 mm. It is glued in the flame-proof casing 20 on its inside. Inside the casing 20 are located the computing circuits 30 which receive, on the one hand, the distributed volume data and, on the other, the unit price data to generate the information corresponding to the cost of the distributed hydrocarbon volume. The electronic computing circuits for hydrocarbon distributors are well known to those in the art.

The distributed volume information is, for example, generated by an optical system 32 which converts the rotation of the shaft 16 into a set of electric pulses whose number is proportional to the rotation and hence to the distributed volume. The device 32 is made up, for example, of a disk 34 mounted on the output shaft 16 and provided with slots which move before an optical detector 36. The latter delivers an electric pulse whenever a slot moves in front of the detector 36. Such a device is of course well known in the art. The shaft 16 goes through the wall of the casing 20 via a bushing 37 having a flange of sufficient sealing length to maintain the explosion-proof properties.

The operating mode control apparatus, which can be used to apply, among other things, the unit price to the computing circuit 30, includes a portable box 40, consequently external to the distributor 10, and an assembly 48, 50 placed inside the explosion-proof casing 22. In the described example, the box 40 includes essentially a control and data input device consisting of the keys 42 of a keyboard, an infrared emitter 44 and an electronic circuit 46 to convert the action on the control keys 42 into a coded infrared signal which will be delivered by the infrared emitter 44. Inside the explosion-proof casing 20 the control apparatus includes an optical detector 48 placed opposite the window 26 and hence capable of receiving the infrared signal delivered by the box 40 when the latter is placed in a suitable position, and an electronic circuit 50 to process the electric signals delivered by the optical detector 48. These signals, representative for example of the unit price of the hydrocarbon, are then applied to the computing circuits 30. Finally, the distributor includes a display device 52, made up for example of an intrinsicly safe liquid crystal cell controlled by the computer 30 placed in the flame-proof casing.

It is thus seen that the apparatus for controlling the operating mode of the distributor comprises, on the one hand, inside the explosion-proof casing, an infrared beam receiver associated with a decoding circuit 50 and, on the other, a portable box 40 external to the distributor and capable of emitting an infrared beam constituting a signal representative of the desired operating mode information. Finally, the apparatus comprises the window 26 provided in the explosion-proof casing which allows the passage of the infrared beam through the explosion-proof casing.

Of course, the box 40 is used by the owner of the distributor only when it is necessary to modify one or more types of information on the operating mode. The new information is then stored by the computing circuits.

It is thus seen that the invention in fact makes it possible to solve the problem involved, since the window 26 does not modify in any way the explosion-proof properties of the explosion-proof casing 22 as it does not create any other passage. Furthermore, the coding of the information provided by means of the box 40 allows a large number of combinations and hence a large number of different types of information. Finally, the use of this control apparatus is very simple and reliable since it is sufficient, in the embodiment described, to depress the appropriate key of the keyboard 42 in order to carry out the action desired.

Figure 3:
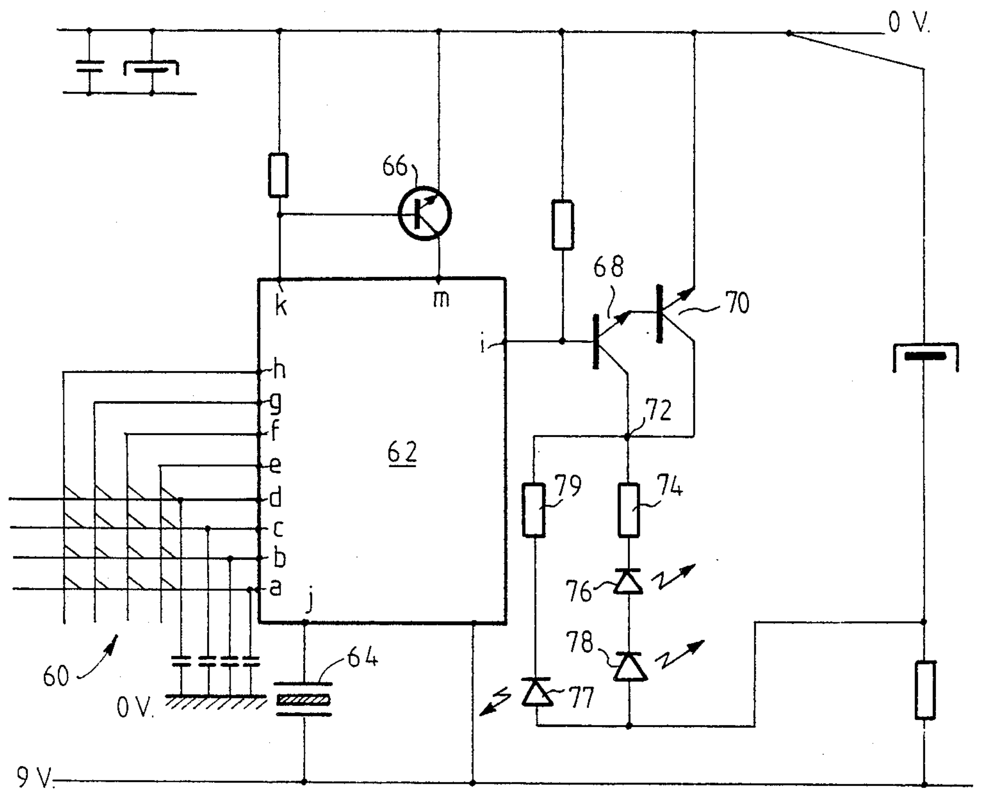
FIG. 3 is a schematic diagram of the infrared-ray emitter circuit of the control apparatus according to the invention.

Referring to FIG. 3, a more detailed description will now be given of the infrared emitter assembly contained in the control box 40. There is first of all a set of conductors 60 associated with the keys of the keyboard 42. These conductors are arranged along lines and columns. In this particular case, there are four lines and four columns. Each conductor is connected to one of the inputs *62a* to *62h* of a decoder 62. This circuit 62 is, for example, of the SDA 2008 type manufactured by Siemens. The decoder 62 is programmed to deliver, on its output *62i*, a serial impulse signal representing a binary code of six serial binary values associated with each combination of a line and a column corresponding to a key of the keyboard 42. The circuit 62 also receives, on its input *62j*, a clock signal, for example at 455 kHz, delivered by a crystal resonator 64. The circuit 62 uses biphase coding which is modulated by a carrier consisting of the frequency signal delivered by the resonator 64. The circuit 62 is programmed to deliver, in addition, a pre-signal to activate the receiver and a start bit. The circuit 62 is preferably supplied only when a key is activated. It is on standby the rest of the time. For this purpose, its power supply input 62*m* is connected to the ground through a transistor 66 acting as a switch and controlled by the signal appearing on the output 62*k* of the circuit 62 when a key is actuated. The coded signal appearing on the output 62*i* of the coder 62 is applied to the input of the amplifier constituted by the transistors 68 and 70. The output 72 of this amplifier is connected, on the one hand, to two infrared emitting diodes 76 and 78 connected in series through the resistor 74 and, on the other, to a light-emitting diode 77 through a resistor 79. The diodes 76 and 78 are also connected to the power supply voltage by a resistor 78'. The diode 77 acts as an operating indicator. Thus, the infrared-emitting diodes 76 and 78 emit infrared signals of sufficient energy representative of the coded signals delivered by the coding circuit 62. They constitute the emitting means 44 of FIG. 2.

Figure 4:
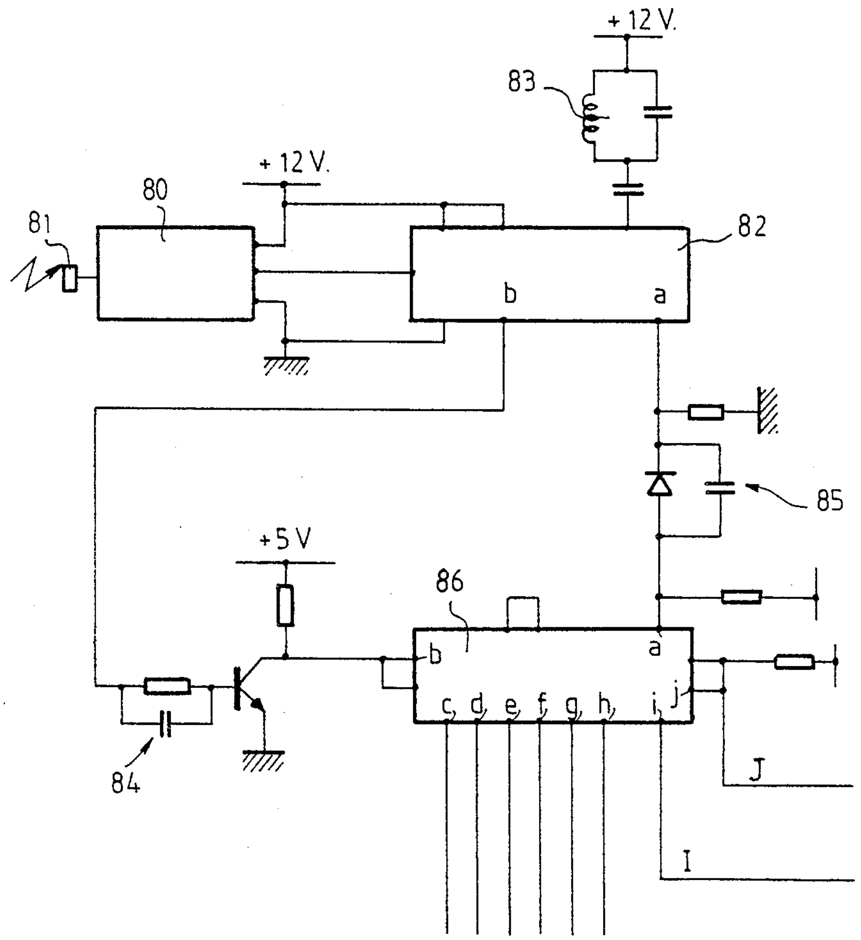
FIG. 4 is a diagram of the infrared-ray receiver circuit of the control apparatus according to the invention.

Referring now to FIG. 4, it is seen that the receiver circuit 50 of FIG. 2 comprises a photodiode 81 placed opposite the window 26 constituting the optical detector 48 of FIG. 2. Its output is connected to the input of a circuit 80 consisting of a variable-gain amplifier and a feedback-connected filter. The output of the circuit 80 is connected to the input of a decoding circuit 82. This circuit is, for example, of the SAB 3271 type manufactured by Siemens. This circuit is tuned to the frequency of the clock of the emitter by an oscillating circuit 83. The output 82*a* of the circuit 82 delivers a coded serial impulse signal representative of the actuated key. The circuit 82 also delivers on its output 82*b* a quantum signal which is applied to a voltage level matching and shaping circuit 84. The output 82*a* of the circuit 82 is connected to the input 86*a* of a shift register 86 via a voltage level matching and shaping circuit 85. The introduction of serial information is controlled by the clock signal applied on the input 86*b* of the register 86 by means of the shaping circuit 84. Thus, on the outputs 86*c* to 86*h*, is found the information delivered by the circuit 82 but in parallel form. These outputs 86*c* to 86*h* of the circuit 86 are connected to the computer 80 which thus receives the operating mode information and in particular the information relative to the unit price of the hydrocarbon. These data are stored in a volatile memory of the computer. The register 86 also delivers, on its output 86*i*, a signal I to control the introduction into the microprocessor 30 of the information contained in the register 86, and the processing of this information. Finally, the register 86 receives from the computer, on its input 86*j*, a reset signal J when an entire code has been introduced into the microprocessor 30.

The preceding description has considered only the transmission of control information by infrared rays. It would also be possible to use radio transmission or ultrasonic transmission. However, infrared transmission is considered to be the most reliable and simplest.

What is claimed is:

1. Apparatus for controlling the operating modes of a hydrocarbon distributor, such modes including the price per unit volume of a hydrocarbon to be distributed, the hydrocarbon distributor being of the type comprising means for measuring the hydrocarbon volume distributed, an explosion-proof enclosure having an external wall, an electronic computing circuit placed inside said enclosure to deliver at least the cost of the distributed hydrocarbon on the basis of the distributed volume information and operating mode data, and means for displaying at least said cost delivered by said computing circuit, said apparatus further comprising:

external control means outside of said distributor to generate a coded infrared wave beam representative of one of the operating mode data;

a window provided in said enclosure and made of a material allowing the passage of said coded infrared beam while keeping said enclosure explosion-proof; and, inside said enclosure, means placed opposite said window and within said enclosure for receiving said coded infrared beam emitted by said external control means and for converting said beam into coded electrical signals, and means for decoding said electric signals and for generating information representative of one of said operating modes for use by said computing circuit in computing said cost of the distributed hydrocarbon.

2. The apparatus of claim 1 wherein said external control means comprise a plurality of keys, each key being associated with one of said operating mode data, an electronic circuit for delivering an associated signal in response to an action on one of said keys, and an infrared-ray emitter controlled by said associated electronic signals to emit infrared rays representative of said associated electric signal.

* * * * *